United States Patent
Kaneko et al.

[11] Patent Number: 5,967,113
[45] Date of Patent: *Oct. 19, 1999

[54] EXHAUST-GAS TEMPERATURE RAISING SYSTEM FOR AN IN-CYLINDER INJECTION TYPE INTERNAL COMBUSTION ENGINE

[75] Inventors: Katsunori Kaneko, Okazaki; Kazunari Kuwabara, Ogaki; Toshio Syudo, Tokyo; Hiromitsu Ando, Okazaki, all of Japan

[73] Assignee: Mitsubishi Jidosha Kogyo Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/987,051

[22] Filed: Dec. 9, 1997

[30] Foreign Application Priority Data

Dec. 12, 1996 [JP] Japan ................................. 8-332517

[51] Int. Cl.⁶ .................................................. F02B 17/00
[52] U.S. Cl. ............................................................ 123/295
[58] Field of Search ............................... 123/179.21, 294, 123/295, 305, 299, 142.5 R, 676, 179.16, 685

[56] References Cited

U.S. PATENT DOCUMENTS

| | | | |
|---|---|---|---|
| 4,432,325 | 2/1984 | Auracher et al. | 123/424 |
| 5,207,058 | 5/1993 | Sasaki et al. | 60/284 |
| 5,331,933 | 7/1994 | Matsushita | 123/295 |
| 5,482,017 | 1/1996 | Brehob et al. | 123/299 |
| 5,537,321 | 7/1996 | Yoshikazi et al. | 123/179.21 |
| 5,666,916 | 9/1997 | Fujieda et al | 123/295 |
| 5,730,099 | 3/1998 | Gillespie | 123/295 |
| 5,749,333 | 5/1998 | Duret | 23/295 |
| 5,785,031 | 7/1998 | Akimoto | 123/295 |
| 5,797,367 | 8/1998 | Iida et al | 123/295 |

FOREIGN PATENT DOCUMENTS 4-183922A  6/1992  Japan .
8-100638A  4/1996  Japan .

*Primary Examiner*—Erick R. Solis

[57] ABSTRACT

An exhaust-gas temperature raising system, installed in an in-cylinder injection type internal combustion engine adapted to spark-ignite fuel injected from a fuel injection valve directly into a combustion chamber, includes an electronic control unit which controls the fuel injection valve to inject the fuel, at a delayed fuel-injection timing in a compression stroke of the engine, in such an amount as to form an overrich air-fuel mixture locally around an ignition plug together with air in the combustion chamber, when the engine is in an operating condition in which an exhaust-gas temperature is required to rise. The electronic control unit controls an engine control parameter so that the fuel injected at the delayed fuel-injection timing and spark-ignited is insufficiently combusted around the ignition plug, and is then mixed with extra oxygen in the combustion chamber so as to be combusted while being affected by a gas flow in the combustion chamber, whereby the exhaust-gas temperature is effectively raised while suppressing the fuel consumption rate to a minimum.

14 Claims, 11 Drawing Sheets

5,967,113

EXHAUST-GAS TEMPERATURE RAISING SYSTEM FOR AN IN-CYLINDER INJECTION TYPE INTERNAL COMBUSTION ENGINE

BACKGROUND OF THE INVENTION

1. Technical Field of the Invention

The present invention relates to an in-cylinder injection type internal combustion engine adapted to inject fuel directly into a combustion chamber and to cause the injected fuel to be spark-ignited for stratified combustion, and more particularly, to a system for raising the exhaust-gas temperature to thereby enable immediate activation of an exhaust-gas purification device of an in-cylinder injection type internal combustion engine when the engine continuously effects a lean combustion operation.

2. Description of the Related Art

For spark-ignition type automotive internal combustion engines, various in-cylinder injection type gasoline engines have been proposed. These types of engines inject fuel directly into a combustion chamber, unlike conventional intake-manifold injection type engines, in which fuel is injected into an intake manifold and transferred to a combustion chamber. An in-cylinder injection type engine is typically arranged to inject fuel from a fuel injection valve into a cavity formed in the top of a piston of the engine, to locally generate an air-fuel mixture having an air-fuel ratio close to the stoichiometric air-fuel ratio around an ignition plug at ignition timing. This enables a proper combustion of a lean air-fuel mixture, whose average air-fuel ratio observed in the entirety of the combustion chamber is lean, reduce the emission of harmful exhaust-gas components, and improve fuel consumption. However, if the engine performs such a lean-combustion operation through the entire operating region, a deficient engine output may occur in some operating condition. To obviate this, the in-cylinder injection type engine is arranged to switch the injection mode between a compression-stroke injection mode and an intake-stroke injection mode depending upon engine operating conditions.

When the engine is in a low-load operating region, the compression-stroke injection mode is selected, in which fuel is injected mainly during compression stroke. In this mode, most of the fuel, injected toward the cavity of the piston during compression stroke, stays in the cavity because of the action of a tumble flow of intake air sucked into the combustion chamber during intake stroke. Therefore, even if such a small amount of fuel, as to make the average air-fuel ratio large, is injected (compression-lean mode), an air-fuel mixture having an air-fuel ratio close to the stoichiometric air-fuel ratio is formed in the cavity around a spark plug, at ignition timing, at which the piston approaches the spark plug. Hence, the, inflammation of the air-fuel mixture by a spark may become possible. This permits a large amount of intake air to be supplied into the cylinder in the compression-stroke injection mode, so that pumping loss is decreased and fuel consumption is greatly improved.

When the engine is in a medium- or high-load operating region, fuel is injected mainly during intake stroke, so as to form a mixture with a uniform air-fuel ratio in the combustion chamber. In this case, a large amount of fuel can be burnt without causing any misfire due to the presence of an overrich mixture around the spark plug, whereby the engine output required at the time of acceleration or during high speed running of a vehicle can be ensured.

At the time of cold start of engine, or during a low-load engine operation at a low ambient air temperature, an in-cylinder injection type internal combustion engine may take much time to activate a catalyst of an exhaust-gas purification device disposed in the exhaust passage of the engine. When the engine is operated in the compression-lean mode where a large amount of intake air is supplied into a cylinder, the flow rate of exhaust gas is high, and hence the exhaust-gas temperature tends to become low. Accordingly, the catalyst may fail to maintain its activated temperature, when the engine is operated in the compression-lean mode even if the catalyst has once reached the activation temperature. To eliminate these problems, various methods are proposed for raising the exhaust-gas temperature to effect a rapid activation of catalyst.

For example, an in-cylinder injection type internal combustion engine proposed in JP-A-4-183922 operates a fuel injection valve during compression stroke of the engine to inject a main fuel into a combustion chamber, and actuates a spark plug to ignite the main fuel. Then, the fuel injection valve is operated again during expansion stroke or during an early stage of exhaust stroke in which the intake valve is kept closed, to thereby inject an additional fuel into the combustion chamber, and the spark plug is actuated again to ignite the additional fuel. However, the proposed system requires a complicated ignition-control logic and cannot produce sufficient energy for the second ignition.

In this regard, JP-A-8-100638 proposes a method for permitting an additional fuel to be burnt without utilizing spark ignition. In the proposed method, a main fuel is injected during compression stroke of an engine, a spark plug is actuated to ignite the main fuel, and an additional fuel is injected during expansion stroke. A flame produced by the inflammation of the main fuel initiated upon spark-operation of the spark plug propagates to the additional fuel and causes the same to be burnt. By this method, the additional fuel can be burnt without the need of re-actuating the spark plug, and the combustion of the additional fuel raises the exhaust-gas temperature, to thereby shorten a time required for activation of the catalyst.

However, according to the proposed method, the additional fuel must be injected during that time period in which the additional fuel can be enflamed by the flame which propagates during the main combustion. Actually, in the proposed method, the injection timing of the additional fuel is set to a value ranging from, e.g., 10° to 80° ATDC in terms of crank angle. However, if the additional fuel is injected during an early stage of expansion stroke like this, part of the thermal energy produced at the time of combustion of the additional fuel is wasted for the work of expansion, so that an intended rise of the exhaust-gas temperature may not be sufficiently achieved. Furthermore, an amount of additional fuel must be increased in order to sufficiently raise the exhaust-gas temperature, causing the fuel consumption to be further worsened.

SUMMARY OF THE INVENTION

An object of the present invention is to provide an exhaust-gas temperature raising system for an in-cylinder injection type internal combustion engine, which system is capable of efficiently raising the exhaust-gas temperature while suppressing the fuel consumption to a minimum.

According to the present invention, there is provided an exhaust-gas temperature raising system for an in-cylinder injection type internal combustion engine in which fuel injected from a fuel injection valve directly into a combustion chamber is spark-ignited for stratified combustion. The exhaust-gas temperature raising system comprises: fuel injection control means for controlling the fuel injection valve to inject the fuel, at a delayed fuel-injection timing in a compression stroke of the engine, in such an amount as to form an overrich air-fuel mixture locally around an ignition plug together with air in the combustion chamber, when the engine is in an operating condition in which an exhaust-gas temperature is required to rise; and engine control means for controlling an engine control parameter so that the fuel injectedat in the compression stake at the delayed fuel-injection timing and spark-ignited is insufficiently combusted around the ignition plug, and is then mixed with extra oxygen in the combustion chamber to be combusted while being affected by a gas flow in the combustion chamber, when a control of the fuel injection valve is carried out by the fuel injection control means.

According to the present invention, when the engine is in an operating condition in which the exhaust-gas temperature is required to rise, such an amount of fuel as to form an overrich air-fuel mixture locally around an ignition plug together with air in the combustion chamber is injected in a compression stroke. Together with the air in the cylinder, the injected fuel produces an overrich air-fuel mixture around the ignition plug. The overrich mixture is ignited at ignition timing in the vicinity of top dead center in the compression stroke. The fuel is not completely combusted around the ignition plug because of a local shortage of air required for complete fuel combustion. Thus, part of the injected fuel is incompletely combusted and produces incomplete-combustion materials such as hydrocarbon and carbon monoxide. When the expansion stroke is entered, a piston moves downward and the incomplete-combustion materials are caused to diffuse in the combustion chamber. At this time, the incomplete-combustion materials are exposed to a high-temperature atmosphere and acquire considerably large activation energy. Thus, the incomplete-combustion materials are permitted to adequately react with oxygen present in the combustion chamber at locations remote from the ignition plug, so that they are re-combusted. The re-combustion takes place moderately, and hence the energy produced by the re-combustion is utilized for a rise in exhaust-gas temperature, without being wasted for expansion work in the engine, whereby a catalyst of an exhaust-gas purification device is immediately heated to be rapidly activated.

The exhaust-gas temperature raising system of the present invention is similar in function and effect to a secondary air system for raising the exhaust-gas temperature. The secondary air system supplies secondary air from an air pump into an exhaust passage in which unburnt materials such as hydrocarbon, carbon monoxide are present, to thereby cause the unburnt materials to be re-combusted at an ambient temperature of approximately 450° C. As compared to the secondary air system, the present invention is advantageous in that it does not require additional devices such as air pump and is hence low-priced.

In the present invention, preferably, said engine control means causes fuel injection timing, serving as the engine control parameter in the compression stroke, to be delayed than that in the compression stroke at the time of an engine operation in which the exhaust-gas temperature is not required to rise, when the control of the fuel injection valve is carried out by said fuel injection control means.

With this preferred arrangement where the fuel injection timing is delayed than that in the compression stroke at the time of the engine operation in which the exhaust-gas temperature is not required to rise, the fuel is not completely combusted around the ignition plug because of insufficient fuel atomization caused by the delayed fuel-injection timing, in addition to a local shortage of air required for complete fuel combustion. Thus, the ex-haust-gas temperature can be raised more effectively.

In the present invention, preferably, the engine control means causes the ignition timing, serving as the engine control parameter, to be delayed than that at the time of an engine operation in which the exhaust-gas temperature is not required to raise, when the fuel injection timing is caused to be delayed than that in the compression stroke at the time of the engine operation in which the exhaust-gas temperature is not required to raise.

With this preferred arrangement, the exhaust-gas temperature can be raised more effectively.

Preferably, the fuel injection control means controls the fuel injection valve so that part of the fuel is precedently injected, prior to the injection of fuel effected at the delayed fuel-injection timing in the compression stroke, at timing which varies in a range from an early stage of an intake stroke to an early stage of the compression stroke. These intake and compression strokes belong to the same operating cycle of the engine.

With this preferred arrangement, part of the fuel to be injected is precedently supplied into the combustion chamber to form an extremely lean air-fuel mixture uniformly therein, and a main fuel, i.e., most of the fuel to be injected, is injected in the compression stroke and spark-ignited to be enflamed. A flame produced in the course of combustion of the main fuel does not propagate to the extremely lean mixture formed by the fuel precedently supplied, so that the extremely lean mixture is kept unburnt. Then, the extremely lean mixture is compressed by the piston which moves upward and is exposed to heat generated in the course of combustion of the main fuel, so that a so-called cool frame reaction takes place in the extremely lean mixture and produces reactive chemical species (cool-flame-reaction products), such as peroxide, hydroxide, and formaldehyde. On an occasion that incomplete-combustion materials diffuse in the combustion chamber during the expansion stroke and react with extra oxygen present apart from the ignition plug so as to be re-combusted, the cool-flame-reaction products serve as inflammation inducers to further promote the re-combustion of the incomplete-combustion materials. As a result, the exhaust-gas temperature is risen, whereby rapid activation of the catalyst of the exhaust-gas purification device is achieved.

Preferably, an amount of fuel to be precedently injected is set to a value varying from 10% to 40% of a total amount of fuel to be injected per operating cycle per cylinder of the engine.

With this preferred arrangement, 10–40% of the total amount of fuel to be injected per operating cycle per cylinder is injected precedently, to make it possible to produce such an amount of cool-flame-reaction products as to properly serve as inflammation inducers, which promote the re-combustion of incomplete-combustion materials, thereby adequately raising the exhaust-gas temperature, while preventing the generation of such an excessively large amount of cool-flame-reaction products as to permit energy generated by re-combustion of incomplete-combustion materials to be wasted for expansion work in the engine.

Preferably, the exhaust-gas temperature raising system further comprises air amount adjusting means for adjusting an amount of air introduced into the combustion chamber. The fuel injection control means controls the fuel injection valve to increase an amount of the injected fuel with increase in the amount of the introduced air adjusted by the air amount adjusting means.

With this arrangement, the amount of air introduced into the combustion chamber increases, and the amount of fuel injected in the compression stroke increases with the increase in the introduced air amount, whereby the effect of raising the exhaust-gas temperature is further enhanced.

DETAILED DESCRIPTION

With reference to the accompanied drawings, an exhaust-gas temperature raising system according to a first preferred embodiment of the present invention and an in-cylinder injection type gasoline engine equipped with this system will be explained in detail.

Figure 1:
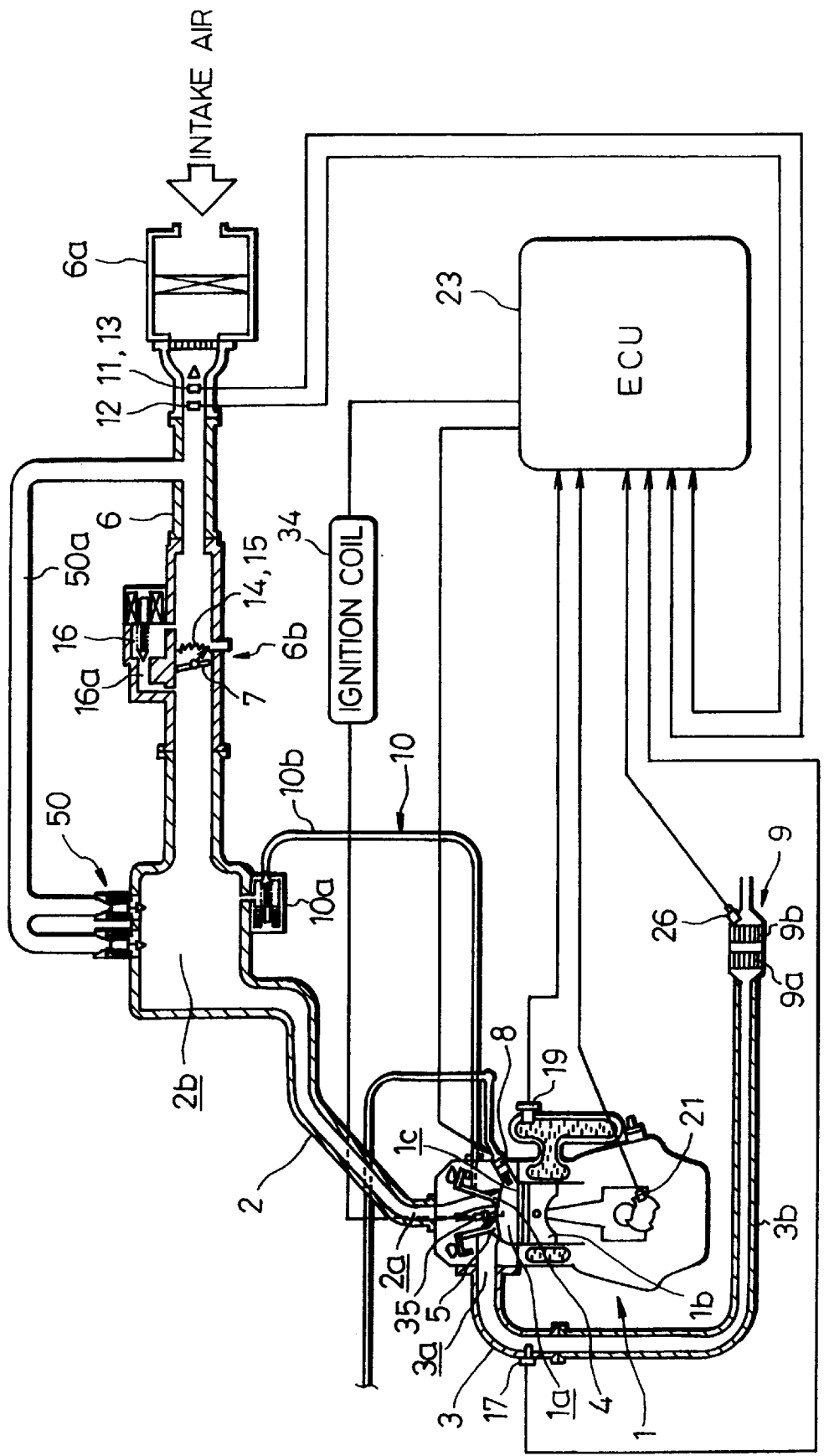
FIG. 1 is a schematic view of an engine provided with an exhaust-gas temperature raising system according to a first embodiment of the present invention.

In FIG. 1, reference numeral 1 denotes a spark ignition, in-cylinder injection type in-line four-cylinder automotive gasoline engine (hereafter referred to simply as an "engine"). The engine 1 is a four-cycle engine and has an operating cycle which consists of intake, compression, expansion and exhaust strokes. The engine has combustion chambers 1a, intake system, an exhaust gas recirculation (EGR) system 10 and the like designed exclusively for in-cylinder injection.

A cylinder head of the engine 1 is fitted with an electro-magnetic fuel injection valve 8 and a spark plug 35 for each cylinder, so that fuel may be injected from the fuel injection valve 8 directly into the corresponding chamber 1a. A hemispherical cavity (FIGS. 10 and 11) is formed in the top surface of a piston disposed in the cylinder for reciprocal motion therein. The cavity is located at a position to which fuel spray can reach if the fuel is injected from the fuel injection valve 8 at the timing at which the piston reaches a reciprocal moving position thereof close to the top dead center in a compression stroke. The theoretical compression ratio of the engine 1 is set to a value (in this embodiment, approximately 12) higher than that of an intake-manifold injection type engine. A DOHC four-valve system is employed as a valve driving mechanism. An intake-side camshaft and an exhaust-side camshaft for respectively driving an intake valve 9 and an exhaust valve 10 are rotatably held at an upper portion of the cylinder head 2.

The cylinder head 2 is formed with intake ports 2a, each of which extends substantially upright between the camshafts. Intake air flow having passed through the intake port 2a can generate a reverse tumble flow in the combustion chamber 1a. Exhaust ports 3a extend substantially in the horizontal direction, as in the case of those of ordinary engines. A large-diameter EGR port, not shown, diverges obliquely from the exhaust port concerned.

In FIG. 1, reference numeral 19 denotes a water temperature sensor for detecting a cooling water temperature Tw; 21, a crank angle sensor for outputting a crank angle signal SGT at predetermined crank positions (in this embodiment, 5° BTDC and 75° BTDC) for each cylinder; and 34, an ignition coil for supplying a high voltage to the spark plug 35. One of the camshafts, which rotate at half the speed of the crankshaft, is fitted with a cylinder discriminating sensor (not shown) for outputting a cylinder discriminating signal SGC, whereby the cylinder, for which the crank angle signal SGT is output, is discriminated based on the sensor signal SGC.

The intake ports 2a are connected, through an intake manifold 2, including a surge tank 2b, with an intake pipe 6 which is provided with an air cleaner 6a, a throttle body 6b, and a stepper-motor type idle speed control valve (hereinafter referred to as idle control valve) 16. The intake pipe 6 is further provided with a large-diameter air bypass pipe 50a, through which intake air is introduced, bypassing the throttle body 6b, to the intake manifold 2, and in which a large linear-solenoid type air bypass valve (ABV valve (air amount adjusting means)) 50 is disposed. The air bypass pipe 50a has a flow area substantially equal to that of the intake pipe 6, so that a quantity of intake air, required for low or medium speed region of the engine 1, can flow through the pipe 50a when the ABV valve 50 is fully open. The idle control valve 16 has a flow area smaller than that of the ABV valve 50 and is used to finely adjust the intake air amount.

The throttle body 6b is provided with a butterfly type throttle valve 7 for opening and closing the intake passage formed therein, a throttle position sensor 14 for detecting the throttle opening degree θth as accelerator opening degree, and an idle switch 15 for detecting a fully-closed state of the throttle valve. An intake air temperature sensor 12 and an atmospheric pressure sensor 13 for determining the density of intake air are disposed in the air cleaner 6a. These sensors deliver output signals indicating the atmospheric pressure Pa and the intake air temperature Ta, respectively. In the vicinity of the inlet of the intake pipe 6, a Karman's vortex type air flow sensor 11 is disposed. The an flow sensor outputs a vortex occurrence signal which is proportional to the volumetric air flow rate Qa per intake stroke.

The aforementioned EGR ports are each connected to the downstream of the throttle valve 7 and the upstream of the intake manifold 2 through a large-diameter EGR pipe 10b in which a stepper-motor type EGR valve 10a is provided.

The exhaust ports 3a are connected to an exhaust manifold 3 provided with an $O_2$ sensor 17. An exhaust pipe (exhaust passage) 3b which is provided with a catalyst converter 9 for exhaust-gas purification, a muffler (not shown) and the like is connected to the exhaust manifold 3. The $O_2$ sensor 17 detects the oxygen concentration in exhaust gas, and outputs a detection signal. Attached on the downstream side of the catalyst 9 is a catalyst temperature sensor 26 for detecting the temperature Tcc of the catalyst or its vicinity (hereinafter referred to as catalyst temperature). The exhaust gas discharged from the combustion chamber 1a to the exhaust manifold 3 enters the catalyst converter 9 in which three harmful exhaust gas components CO, HC, and NOx are purified, and is then muffled by the muffler, to be discharged to the atmospheric air.

The catalyst 9, which is a combination of a lean NOx catalyst 9a and a three way catalyst 9b, is suitable for the engine 1 arranged to perform fuel-economy operation while controlling the air-fuel ratio to the fuel-lean side (lean side). The three way catalyst 9b purifies CO, HC, and NOx in exhaust gas when the engine operates at the stoichiometric air-fuel ratio. The lean NOx catalyst 9a purifies NOx in exhaust gas which cannot sufficiently be purified by the three way catalyst 9b, when the engine operates with a lean air-fuel mixture. The three way catalyst 9b is positioned on the downstream side of the lean NOx catalyst 9a, and consequently, the purification of NOx in the lean NOx catalyst 9a is not interrupted by the three way catalyst 9b, and CO and HC which cannot sufficiently be purified in the lean NOx catalyst 9a can surely be purified in the three way catalyst 9b. By the way, if the lean NOx catalyst has a three way function, it is possible to provide the lean NOx catalyst only.

A fuel tank, not shown, is disposed at the rear of avehicle body. Fuel is supplied from the fuel tank to the fuel injection valves 8 through a fuel supply system, not shown. Namely, fuel stored in the fuel tank is sucked up by an electric motor-operated lower pressure fuel pump, and supplied to the engine 1 through a low-pressure feed pipe. The fuel supplied toward the engine 1 is fed to each fuel injection valve 8 through a high-pressure feed pipe and a delivery pipe by a high-pressure fuel pump which is attached to the cylinder head.

An ECU (electronic control unit) 23 is provided in a passenger cabin of the vehicle and includes an I/O unit, storage units (ROM, RAM, BURAM, etc.) used to store control program, control map and the like, central processing unit (CPU), timer counter, and the like. The ECU 23 conducts an overall control of the engine 1.

Various switches for detecting the operating states of an air conditioner, power steering device, automatic transmission and the like, which apply loads to the engine 1 when operated, are respectively connected to the input side of the ECU 23 which receives respective detection signals from these switches. In addition to the above-mentioned various sensors and switches, many switches and sensors (not shown) are connected to the input side of the ECU 23, the output side of which is connected to warning lights, pieces of equipment and the like.

In accordance with input signals supplied from the sensors and switches concerned, the ECU 23 determines fuel injection mode, fuel injection amount, fuel-injection termination timing, ignition timing, EGR gas introduction amount and the like, and then controls the fuel injection valves 8, the ignition coil 34, the EGR valve 10a and the like.

Next, an ordinary control of the engine 1 effected in a case where an exhaust-gas temperature raising control, described later, is not performed will be explained briefly.

At the start of the engine, which is in a cold state, the ECU 23 selects the intake-stroke injection mode, and controls fuel injection to attain a relatively rich air-fuel ratio. The reason for doing this is that since the rate of vaporization of fuel is low when the engine is in a cold state, a misfire and emission of unburnt fuel components are unavoidable if the fuel injection is performed in the compression-stroke injection mode. Furthermore, the ECU 23 closes the ABV valve 50 during the engine start-up. In this case, intake air is supplied into the combustion chamber 1a through clearances between the throttle valve 7 and the peripheral wall of the intake pipe 6 and through the bypass passage where the idle control valve 16 is disposed. By the way, the idle control valve 16 and the ABV valve 50 are unitarily controlled by the ECU 23, and their valve opening degrees are determined according to an introduction quantity of intake air (bypass air) to be supplied, bypassing the throttle valve 7, to the engine.

After the start-up of the engine and until the cooling water temperature Tw rises to a specified value, the ECU 23 selects the intake-stroke injection mode for fuel injection, as in the case of engine start-up, and keeps the ABV valve 50 closed. Furthermore, as in the case of an intake-manifold injection type engine, idle speed control is carried out by adjusting the opening degree of the idle control valve 16 in accordance with the engine load which increases and decreases with a change in the operating state of auxiliary machinery such as air conditioner. The ABV valve 50 is also opened, if needed. When the $O_2$ sensor 17 reaches its activation temperature, the ECU 23 starts the air-fuel ratio feedback control according to the output voltage of the $O_2$ sensor 17, so that harmful exhaust gas components may be purified by the catalyst 9.

As explained above, when the engine is in a cold state, the fuel injection control is performed in a manner similar to that for the intake-manifold injection type engine. Control response and control accuracy are high in the in-cylinder injection type engine 1 which entails no adhesion of fuel drops onto inner wall surfaces of intake ports.

Figure 2:
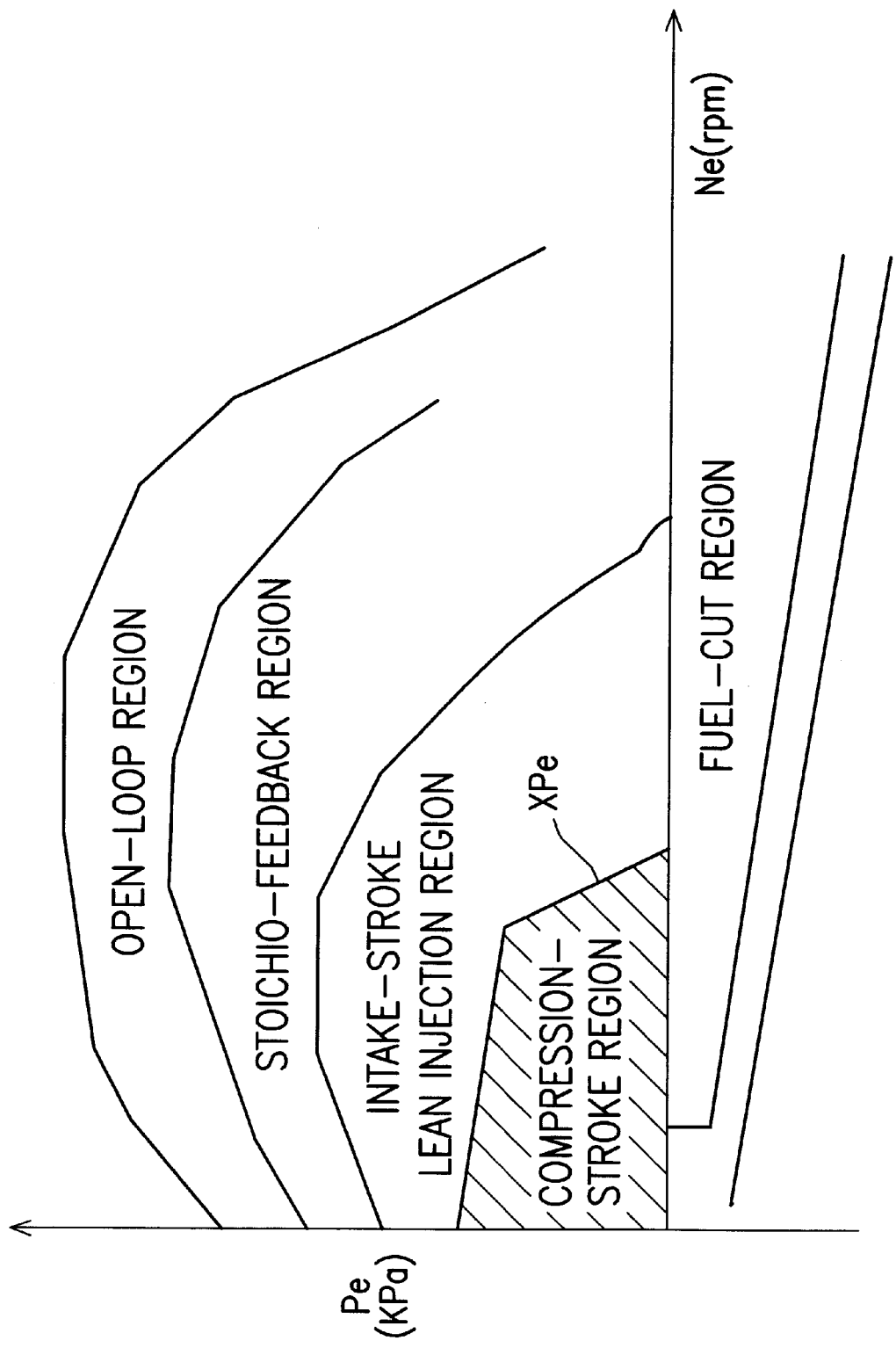
FIG. 2 is a view showing a map on which a fuel-injection control region at the time of ordinary engine operation is determined.

Upon completion of warming-up the engine 1, the ECU 23 retrieves a fuel-injection control region at the present time from the fuel-injection control map in FIG. 2 on the basis of engine speed Ne and target effective in-cylinder pressure (target load) Pe determined by throttle opening θ th or the like. Then, a fuel injection mode and a fuel injection quantity, which are suitable for the present control region, are determined, and the fuel injection valve 8 is driven. In addition, a control of opening degrees of the ABV valve 50 and the EGR valve 45 is carried out.

For example, when the engine is in a low-load, low-speed region, e.g., at the time of idle operation, the engine is operated in the compression-stroke lean injection region shown by the hatched region in FIG. 2. In this case, the ECU 23 selects the compression-stroke injection mode, controls the opening degrees of the ABV valve 50 and the EGR valve 10a according to the engine operating state, and controls the fuel injection to inject such a quantity of fuel as to make the air-fuel ratio lean (in the present embodiment, approximately 20 to 40). The intake air, sucked through the intake port 2a into the combustion chamber before the fuel injection, forms an inverse tumble flow. By the action of the inverse tumble flow, fuel spray is retained in the cavity 1c formed in the piston. Consequently, at ignition timing, an air-fuel mixture with an air-fuel ratio close to the stoichiometric air-fuel ratio is formed around the spark plug 35. After completion of warming-up of the engine, the vaporization rate of fuel increases. Accordingly, even if the whole or average air-fuel ratio is made extremely lean (for example, approximately 50), the injected fuel is permitted to be enflamed. Because of the engine operation at such a lean air-fuel ratio, the emission of CO and HC becomes very small, and the emission of NOx can also be restrained to a low level by exhaust-gas recirculation. Moreover, by opening the ABV valve 50 and the EGR valve 10a to supply large amounts of air and exhaust gas, the pumping loss is reduced. Because of the engine operation with the lean air-fuel ratio in cooperation with the reduction of pumping loss, the fuel consumption is largely improved. An idle speed control responsive to the increase and decrease of engine load is performed by increasing or decreasing the quantity of fuel injection, so that control response is also very high.

When the engine runs at a low or middle speed, the engine is operated in the intake-stroke lean region or the stoichio feedback region (stoichiometric air-fuel ratio feedback control region) shown in FIG. 2. In that case, the ECU 23 selects the intake-stroke injection mode.

More specifically, if the engine operating state, represented by average effective pressure Pe and engine speed Ne, belongs to the intake-stroke lean region, the intake-stroke lean injection mode is selected, and the opening degree of the ABV valve 50 and the quantity of fuel injection are so controlled as to attain a relatively lean air-fuel ratio (for example, approximately 20 to 23). In the intake-stroke lean injection mode, the intake air entering through the intake port 2a forms an inverse tumble flow in the combustion chamber, to produce a turbulence effect. Therefore, by controlling the fuel-injection start timing and the fuel-injection termination timing, inflammation of the mixture having such a lean air-fuel ratio is enabled.

When the engine operates in the stoichio-feedback region (S-FB region), the S-FB control mode is selected, and the EGR valve 10a is controlled to be opened and closed, with the ABV valve 50 kept closed (the control of the EGR valve 10a is made only when the engine operates in a specified range of the S-FB region). In addition, the air-fuel ratio feedback control is performed according to the output voltage of the O2 sensor 17. In the S-FB region, a larger engine output is obtained for the reason that the engine operates at a high compression ratio, and harmful exhaust-gas components are purified by the catalyst 9, with the emission of NOx reduced by exhaust-gas recirculation.

When the engine is rapidly accelerated or runs at a high speed, the open-loop control region shown in FIG. 2 is entered. The ECU 23 selects the open-loop control mode (intake-stroke injection mode), closes the ABV valve 50, and controls fuel injection according to throttle opening θth, engine speed Ne and the like to attain a relatively rich air-fuel ratio. During this mode, a high engine output can be obtained for the reasons that the compression ratio is high, a stream of intake air forms the inverse tumble flow, and inertia effect is attained since the intake port 2a extends approximately upright relative to the combustion chamber 1a.

At the time of coasting engine operation while the engine runs at a middle or high speed, the fuel-cut region shown in FIG. 2 is entered. The ECU 23 completely stops the fuel injection, so that the fuel consumption is improved and the emission of harmful exhaust-gas ingredients is decreased. The fuel-cut operation is immediately stopped, if the engine speed Ne becomes lower than a restoration speed, or if the driver depresses the accelerator pedal.

In the following, the operation of the exhaust-gas temperature raising system having the aforementioned construction will be explained.

Figure 3:
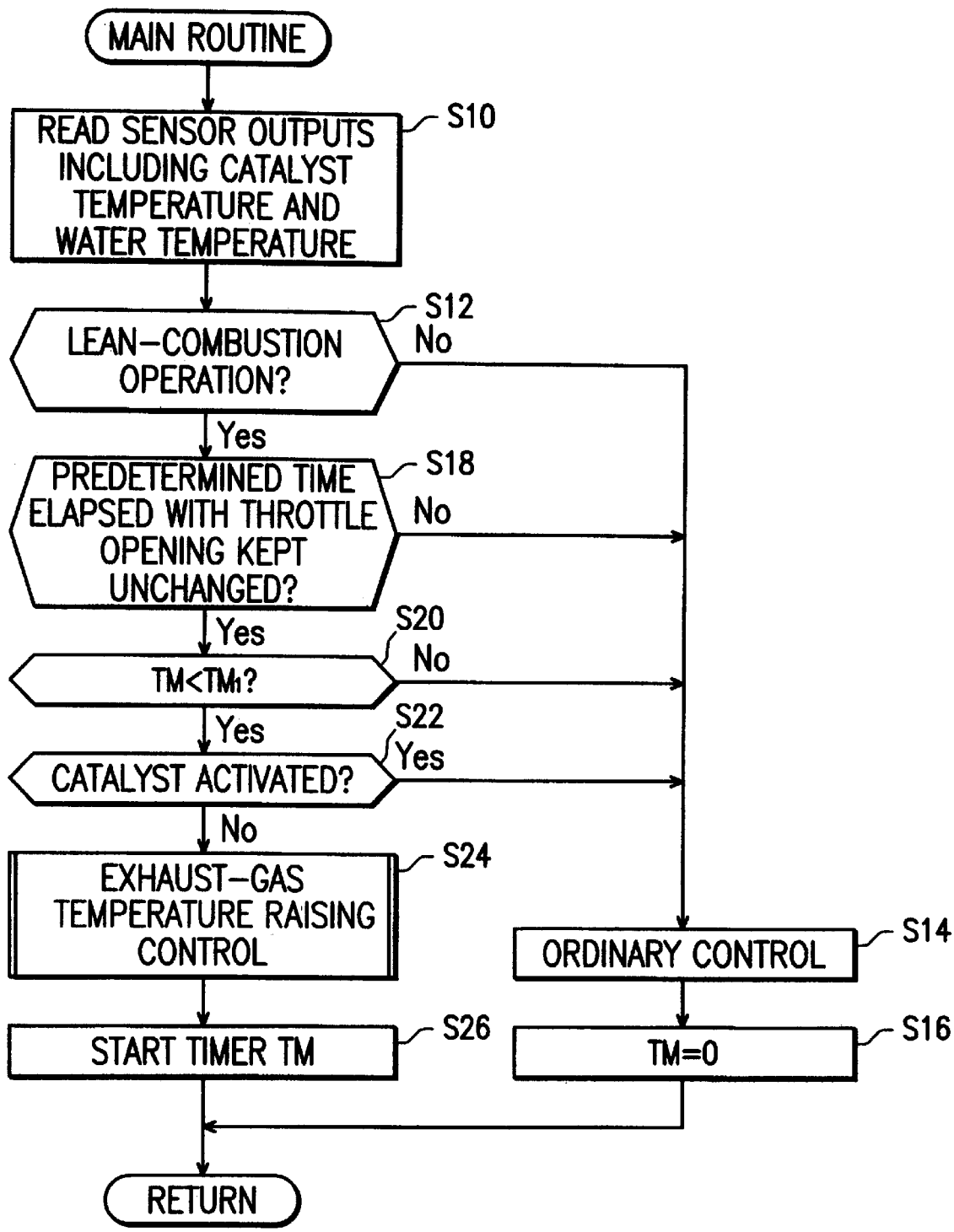
FIG. 3 is a flowchart showing a main routine for exhaust-gas temperature raising control executed by the exhaust-gas temperature raising system shown in FIG. 1.

The main routine for exhaust-gas temperature raising control shown in FIG. 3 is executed by the ECU 23 each time a crank angle signal SGT is output from the crank angle sensor 21, while the above-mentioned ordinary engine control is carried out.

First, at step S10, the ECU 23 reads various engine operating state quantities respectively detected by various sensors. The thus detected quantities include the catalyst temperature Tcc, engine cooling water temperature Tw, intake air flow rate Qa, throttle opening θth, engine speed Ne, atmospheric pressure Pa, and intake air temperature Ta.

Next, in order to determine whether or not first to fourth conditions for execution of the exhaust-gas temperature raising control (hereinafter referred to as first to fourth requirements) are satisfied, steps S12, S18, S20 and S22 are executed in sequence.

At step 12, a determination is made as to whether or not the engine 1 is operating in a lean-combustion state where stratified combustion or premixed lean-combustion is made. More specifically, whether or not the engine 1 is operated in the lean-combustion operating region (the compression-stroke lean injection region or the intake-stroke lean injection region shown in FIG. 2) is determined based on engine speed Ne and target in-cylinder effective pressure Pe, which is determined from throttle valve opening θth and engine speed Ne. Also, a determination is made as to whether or not a change in the throttle valve opening θth is small so that a vehicle is in a steady running state, by determining whether or not the difference between the throttle valve opening θth read at step S12 and that read in the preceding control cycle exceeds a certain threshold value.

The reason why the first requirement requires that the engine is operated in a lean-combustion state and that a change in throttle valve opening is small is as follows:

A lean mixture whose air-fuel ratio ranges from about 20 to 40 can generate, when combusted, a small quantity of heat. Thus, when the engine is operated in a lean-combustion state, especially in a stratified-combustion state, an amount of heat generated by the combustion becomes small, so that the exhaust-gas temperature Tex becomes low. In such a case, the catalyst temperature Tcc of the catalyst converter 9 is likely to be lower than a lower activation temperature limit T1 (e.g., 400° C.).

A change in throttle valve opening θth in the increasing direction indicates a request for accelerated engine operation. In response to the request for deceleration, the fuel injection amount is increased. Hence, the exhaust-gas temperature may increase even if no exhaust-gas temperature raising control is made. When the throttle valve opening θth changes to decrease when the engine runs at a medium or high speed, fuel cut control is carried out to stop the fuel supply to the engine. In the fuel-cut region, if fuel is supplied to increase the exhaust-gas temperature, a decelerated engine operation which meets the driver's intention of deceleration cannot be made.

If the result of the determination at step S12 is negative (No), that is, if the engine is not operated in the lean-combustion region or if a substantial change in throttle opening θth is determined, then it is determined that the engine is operated with an air-fuel ratio close to the stoichiometric air-fuel ratio in a premixed-combustion region other than the stratified-combustion region and the premixed lean-combustion region. In this manner, if the first requirement is not satisfied and hence the execution of the exhaust-gas temperature raising control is unnecessary, the flow advances to step S14 wherein the aforementioned ordinary control is carried out. More specifically, normal fuel-injection control and normal ignition-timing control, which meet the present engine operating region, are carried out. Next, at step S16, a timer TM which measures a time elapsed from the start of the exhaust-gas temperature raising control is reset to a value of 0.

If the result of determination at step S12 is affirmative (Yes), that is, if the engine is operated in the lean-combustion region (compression-stroke lean injection region or intake-stroke lean injection region) and if a change in throttle opening θth is small to indicate that the vehicle is in a steady running state, it is determined that the engine is operated in the lean-combustion region or in the premixed lean-combustion region. When the first requirement is satisfied in this manner, the flow advances to step S18 to determine whether or not the second requirement is satisfied.

At step S18, a determination is made as to whether or not a time measured by that timer reaches the aforementioned predetermined time period, which is caused to restart when the difference between the throttle opening θth read at step S10 and that read in the preceding control cycle exceeds a certain threshold value. In other words, whether or not the throttle opening θth is maintained substantially at constant for the predetermined time period is determined at step S18.

The reason why the second requirement requires that the throttle opening θth is maintained at constant over the predetermined time period is as follows: While the throttle opening θth is maintained at constant under the condition the first requirement is satisfied, the engine operation in the lean-combustion state where the catalyst temperature Tcc tends to decrease is continued. Thus, if a substantial change does not occur in the throttle opening θth for the predetermined time period, it is understood that the catalyst temperature Tcc is more likely to decrease.

If the result of determination at step S18 or if the second requirement is not satisfied, the flow advances to step S14 where the ordinary control is carried out.

If the result of determination at step S18 is affirmative for the reason, e.g., that the idle engine operation in the compression-stroke lean injection region continues for the predetermined time period, it is determined that the second requirement is satisfied and hence the flow proceeds to step S20 in order to make a determination as to whether or not the third requirement is satisfied.

At step S20, whether or not a time period, measured by the timer TM and indicative of the time for which the exhaust-gas temperature raising control has been conducted, is less than a predetermined time period TM1 is determined. The reason why the third requirement requires that the first and second requirments comtinue for a time period less than the predetermined time period TM1 is as follows: It is unnecessary to raise the exhaust-gas temperature for activation of the catalyst, if the exhaust-gas temperature raising control has been carried out for a time period equal to or longer than the predetermined time period TM1 so that the catalyst converter 9 has been ordinarily already activated.

If the result of determination at step S20 is negative or if the time period measured by the timer TM reaches the predetermined time period TM1, then it is determined that the third requirement is not satisfied. In this case, the flow proceeds to step S14 where the aforementioned ordinary control is carried out.

On the other hand, if the result of determination at step S20 or if the time period measured by the timer TM is less than the predetermined time period TM1, then it is determined that the third requirement is satisfied, and the flow advances to step S22.

At step S22, a determination is made as to whether or not the catalyst converter 9 is in an activated state, by determining whether or not the catalyst temperature Tcc is equal to or higher than the lower activation temperature limit T1 (e.g., 400° C.).

If the result of determination at step S22 is affirmative or if the catalyst temperature Tcc is equal to or higher than the lower activation temperature limit T1 (at the time of unfulfillment of the fourth requirement), it is unnecessary to carry out the exhaust-gas temperature raising control for the activation of the catalyst converter. In this case, the flow proceeds to step S14 where the ordinary control is carried out.

On the other hand, if the result of determination at step S22 is negative or if the first to fourth requirement, i.e., the first to fourth conditions for execution of the exhaust-gas temperature raising control are satisfied, the flow advances to step S24 where the exhaust-gas temperature raising control is carried out.

In a case where the engine is operating, just before the start of the exhaust-gas temperature raising control, in the compression-stroke lean injection mode to effect the stratified combustion, the fuel injection amount, fuel injection timing, ignition timing, etc., are changed to those for the exhaust-gas raising control, while preventing a substantial change in engine output torque. In a case where the engine is operating in the intake-stroke lean injection mode, just before the start of the exhaust-gas temperature raising control, to effect the premixed lean combustion, the fuel injection amount, fuel injection timing, ignition timing, etc., are changed to those for the compression-stroke lean injection mode, while preventing a substantial change in engine output torque. Ordinarily, the opening degrees of the ABV 50, etc., are kept unchanged when a shift is made from the ordinary control to the exhaust-gas temperature raising control. Especially, as for the ABV, no opening/closing control is made at that time.

Figure 4:
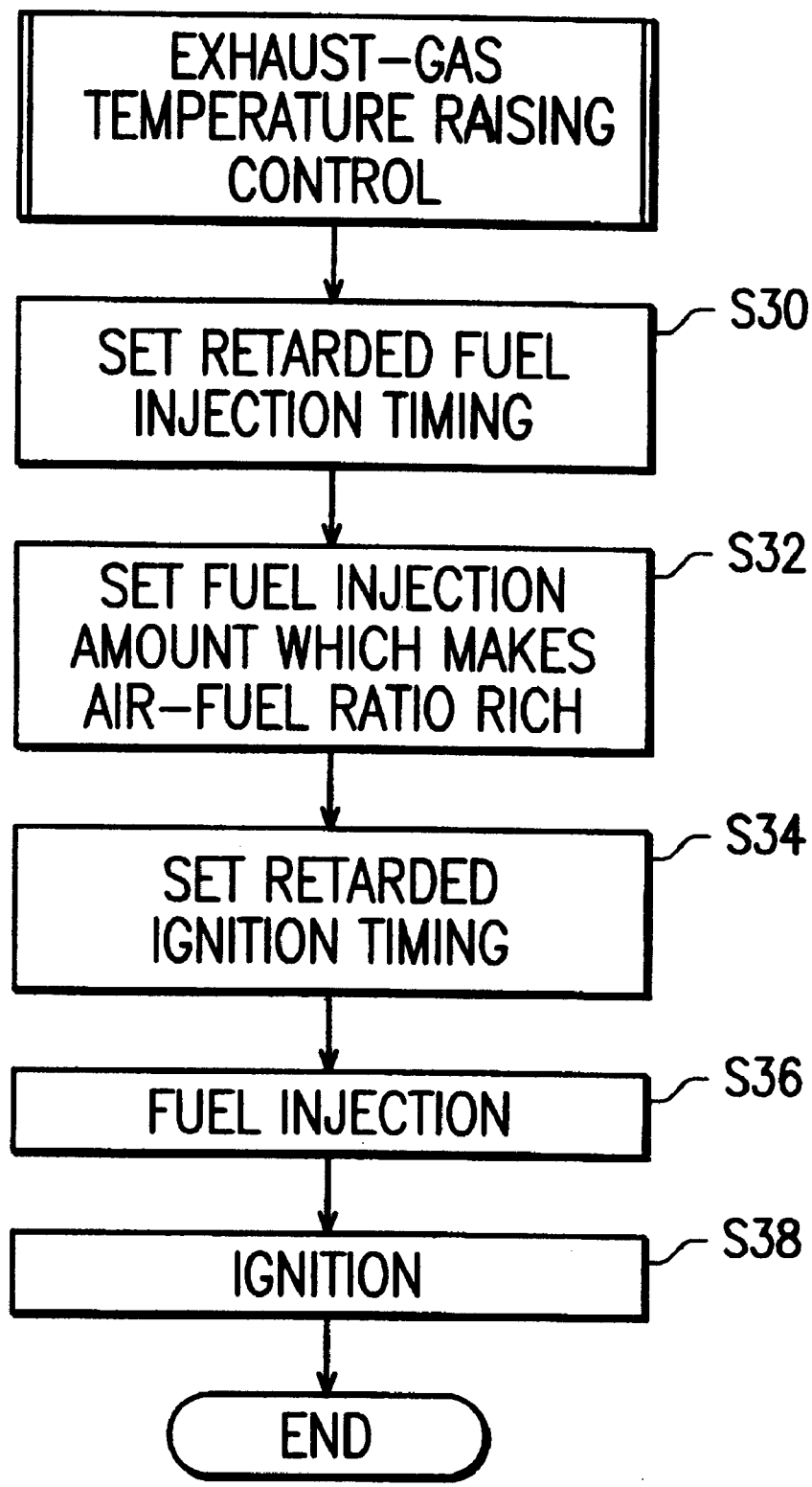
FIG. 4 is a flowchart showing, in detail, the exhaust-gas temperature raising control routine shown in FIG. 3.

In the exhaust-gas temperature raising control at step S24, an exhaust-gas temperature raising control routine shown in FIG. 4 is executed. Meanwhile, in the exhaust-gas temperature raising control, the fuel injection is performed in the compression stroke, as in the case of the compression-stroke lean injection mode for the normal control.

At step S30, the ECU 23 serving as engine control means sets the fuel injection timing (engine control parameter) so as to be retarded as componed to that for the normal control. More specifically, the fuel injection timing is greatly retarded from, e.g., 57° BTDC suitable for the compression-stroke lean injection mode in the ordinary control to a value ranging from 20° BTDC to TDC. Preferably, the fuel injection timing for the exhaust-gas temperature raising control is set to a value falling within a range from 15° BTDC to 5° BTDC.

At step S32, the fuel injection amount is set to such a value as to locally form a rich air-fuel mixture in the cavity 1c. More specifically, in the exhaust-gas temperature raising control, a rich mixture having an air-fuel ratio ranging from 8 to 10 is formed in the cavity 1c, unlike the compression-stroke lean injection mode for the normal control in which an air-fuel mixture having an air-fuel ratio close to the stoichiometricair-fuelratioisformedinthecavity. Besides, the fuel injection amount for the exhaust-gas temperature raising control is set to such a value as to make the entire or average air-fuel ratio equal to the stoichiometric air-fuel ratio or to a slightly lean air-fuel ratio of 14 to 18, for instance.

At step S34, the ignition timing (engine control parameter) is set by the ECU 23 serving as engine control means to a value retarded than that for the normal control, as in the case of the fuel injection timing. That is, the ignition timing which ranges, e.g., from 20° BTDC to 25° BTDC for the compression-stroke lean injection mode in the normal control is greatly retarded to a value ranging from 15° BTDC to 5° ATDC, preferably ranging from 10° BTDC to TDC, in dependence on the fuel injection timing.

Next, at step S36, fuel injection is carried out based on the thus set fuel injection timing and fuel injection amount. At step S38, the ignition is made based on the ignition timing set in the above manner.

In the following, with reference to FIG. 5, the function of the exhaust-gas temperature raising control will be further explained.

Figure 5:
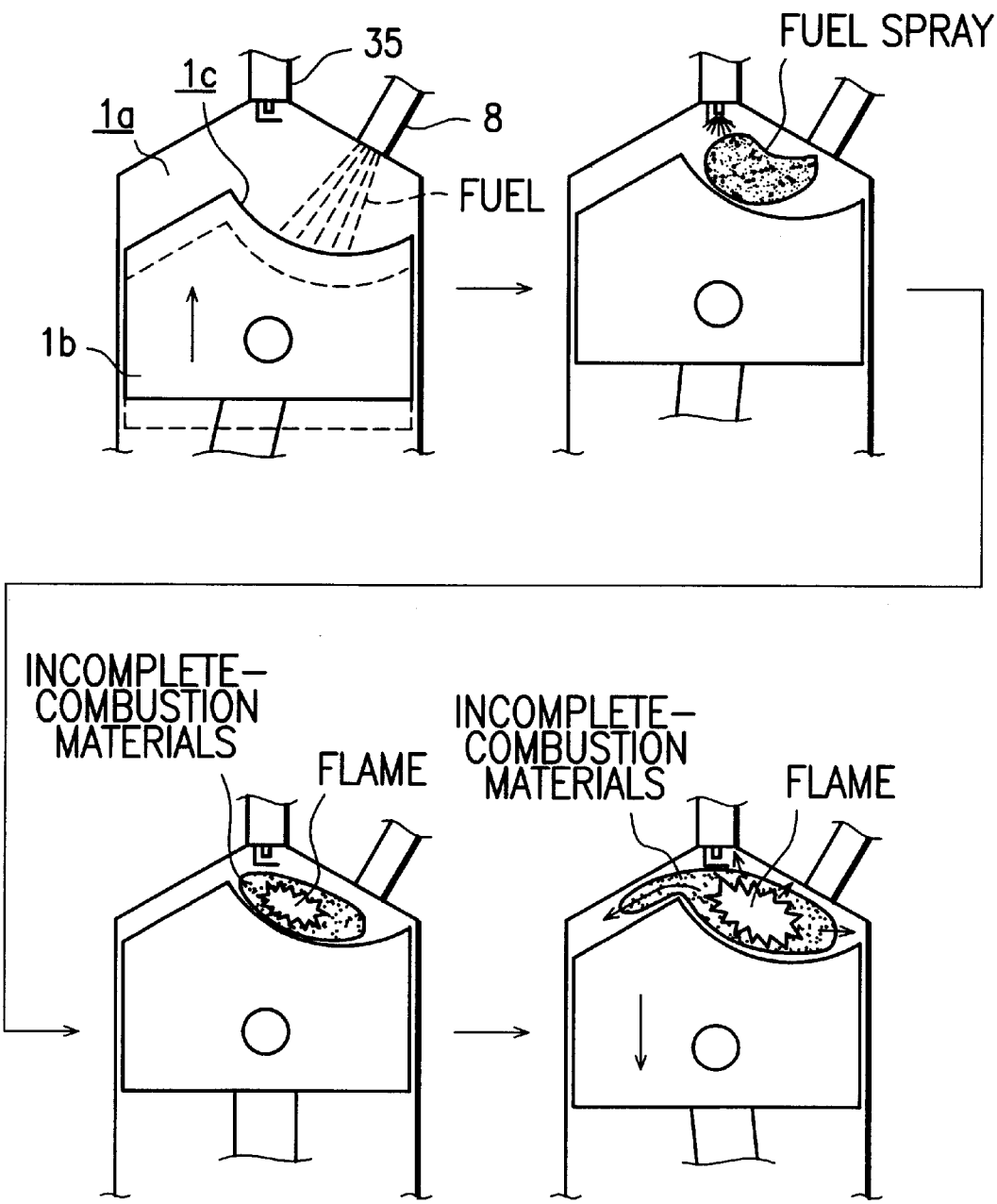
FIG. 5 is a view showing the sequence from a fuel injection process to a combustion process, observed when the exhaust-gas temperature raising control of the first embodiment is carried out.

At first, as shown in upper left part of FIG. 5, fuel is injected from the fuel injection valve 8 in compression stroke in amount larger than the ordinary injection, i.e., in amount such as to locally form a mixture having a rich air-fuel ratio ranging, e.g., from 8 to 10. At the fuel injection timing, which is retarded to a value of 20° BTDC to TDC as mentioned above, the piston 1b is at a upward position than the ordinary piston position illustrated by broken line.

Then, as shown at upper right part of FIG. 5, the ignition is made at the timing ranging from 15° BTDC to 5° ATDC.

Ordinarily, the crank angle difference between the fuel injection timing (approximately 57° BTDC) and the ignition timing (20° BTDC to 25° BTDC) ranges from 32° to 37°, so that most of fuel spray reaches the ignition plug 35 at the ignition timing. By contrast, in the case of the exhaust-gas temperature raising control, the crank angle difference between the fuel injection timing and the ignition timing, which varies from 15° BTDC to 5° ATDC depending on the fuel injection timing, is approximately 5°. In this case, as shown at upper right part of FIG. 5, a leading part of the fuel spray alone reaches the ignition plug 35 at the ignition timing. If the ignition is made at the time when the leading part of the fuel spray reaches the ignition plug 35, the fuel spray is adequately enflamed since sufficient air is present around the ignition plug 35, so that combustion of the fuel spray begins. In other words, improper inflammation of fuel caused by a shortage of air does not occur, unlike a case where the ignition is made when a rich air-fuel mixture is fully formed around the ignition plug 35.

A flame produced at the leading part of the fuel spray at the start of combustion causes the fuel spray to make a hot-flame reaction with oxygen in the cavity 1c. As a result, the flame propagates as shown at lower left part of FIG. 5, so that the resultant combustion gas starts to expand. At this time, in the cavity 1c, an overrich mixture having an air-fuel ration ranging from 8 to 10 is present, while there is no sufficient amount of oxygen for combustion of such overrich mixture. Thus, part of the overrich air-fuel mixture is incompletely combusted and produces incomplete-combustion materials such as hydrocarbon and carbon monoxide.

As the piston 1b moves downward, the incomplete-combustion materials diffuse away from the cavity 1c in the combustion chamber 1a, as shown at lower right part of FIG. 5.

Since air sucked into the combustion chamber 1a in the intake stroke is present at locations outside the cavity at this point in time, the incomplete-combustion materials adequately react with oxygen contained in the air, to be re-combusted. In the expansion stroke, in which the pressure within the combustion chamber 1a decreases, the re-combustion of the incomplete-combustion materials takes place relatively slowly and most of the resultant energy is not wasted for the expansion work in the engine. The re-combustion of the incomplete-combustion materials moderately continues until the exhaust stroke is entered.

Figure 6:
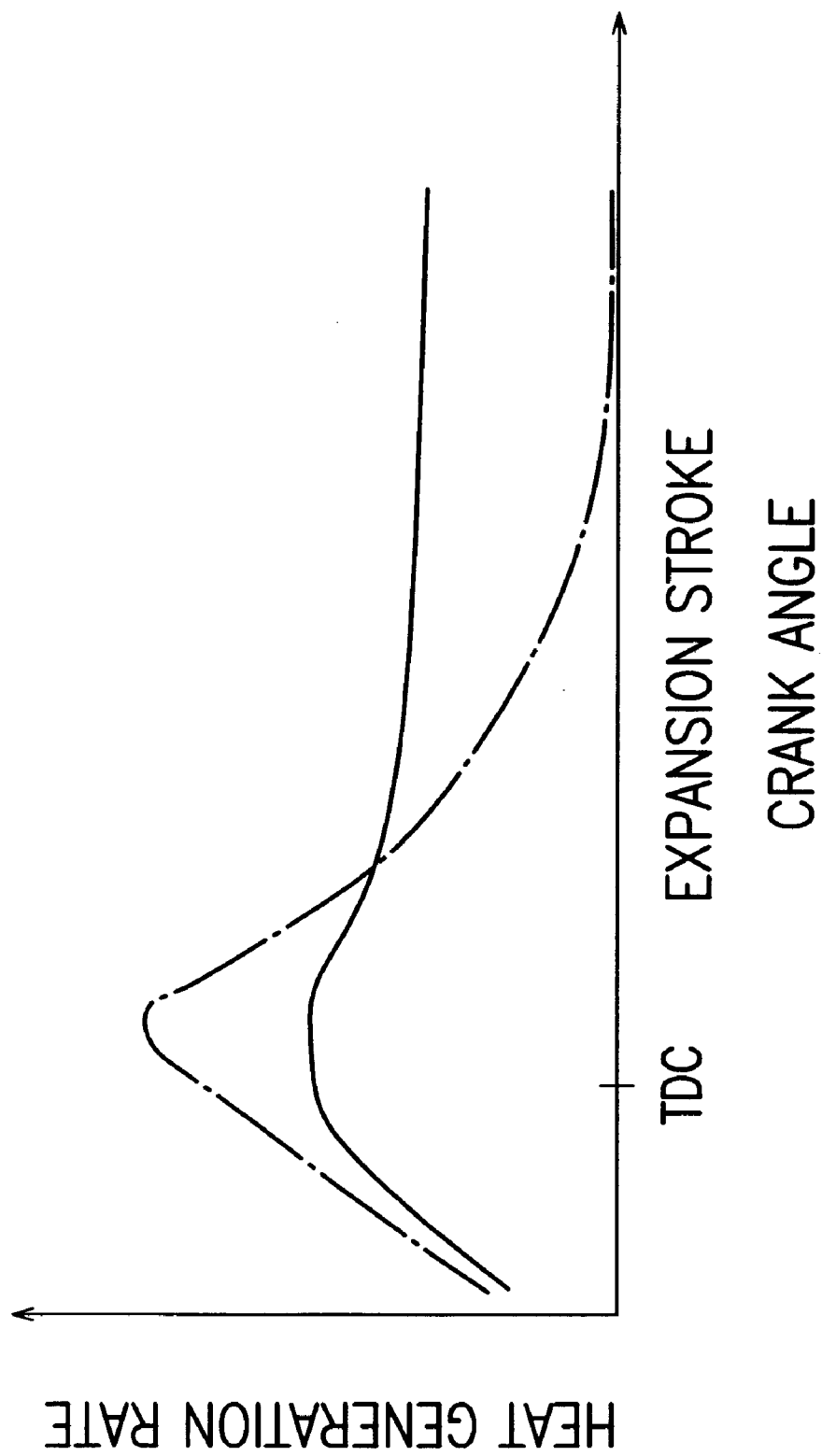
FIG. 6 is a graph showing, as a function of crank angle, a heat generation rate mainly in expansion stroke observed when the exhaust-gas temperature raising control of the first embodiment is carried out.

In FIG. 6, a heat generation rate in expansion stroke observed when the exhaust-gas temperature raising control is made and that observed when the normal control is made in compression-stroke lean injection mode are shown as a function of crank angle by a solid line and a one-dotted chain line, respectively. As seen from FIG. 6, the exhaust-gas temperature raising control causes the combustion to take place more slowly than that in the ordinary control, and maintains the heat generation rate at a level higher than that in the ordinary control, thereby making it possible to raise the exhaust-gas temperature Tex to a value of T2, e.g., 800° C. to rapidly heat the catalyst converter 9 for early activation of the same.

Just after the start of the exhaust-gas temperature raising control, the timer TM which measures a time period elapsed from the start of this control is started at step S26 of FIG. 3.

If the time period measured by the timer TM reaches a predetermined time period TM1 so that the result of determination at step S20 is negative, or if the catalyst converter 9 is activated so that the result of determination at step S22 is affirmative, the exhaust-gas temperature raising control is finished. Whereupon, the timer TM is reset to avalue of 0 at step S16.

In the following, an exhaust-gas temperature raising system according to a second embodiment of the present invention will be explained.

The system of the present embodiment is featured in that a precedent fuel-injection where part of fuel to be injected is injected in intake stroke is made precedently to a main fuel-injection where the remaining most part of fuel is injected in compression stroke. That is, the exhaust-gas temperature raising system of this embodiment is different from the system of the first embodiment, which carries out a one-stage fuel injection, in that a two-stage fuel injection is carried out, which consists of the intake-stroke precedent fuel-injection and the main fuel-injection, but is similar thereto in other respects. That is, the system of the present embodiment is applicable to engines of the type shown in FIG. 1 and executes the main routine shown in FIG. 3 for exhaust-gas temperature raising control, as in the case of the first embodiment.

Figure 7:
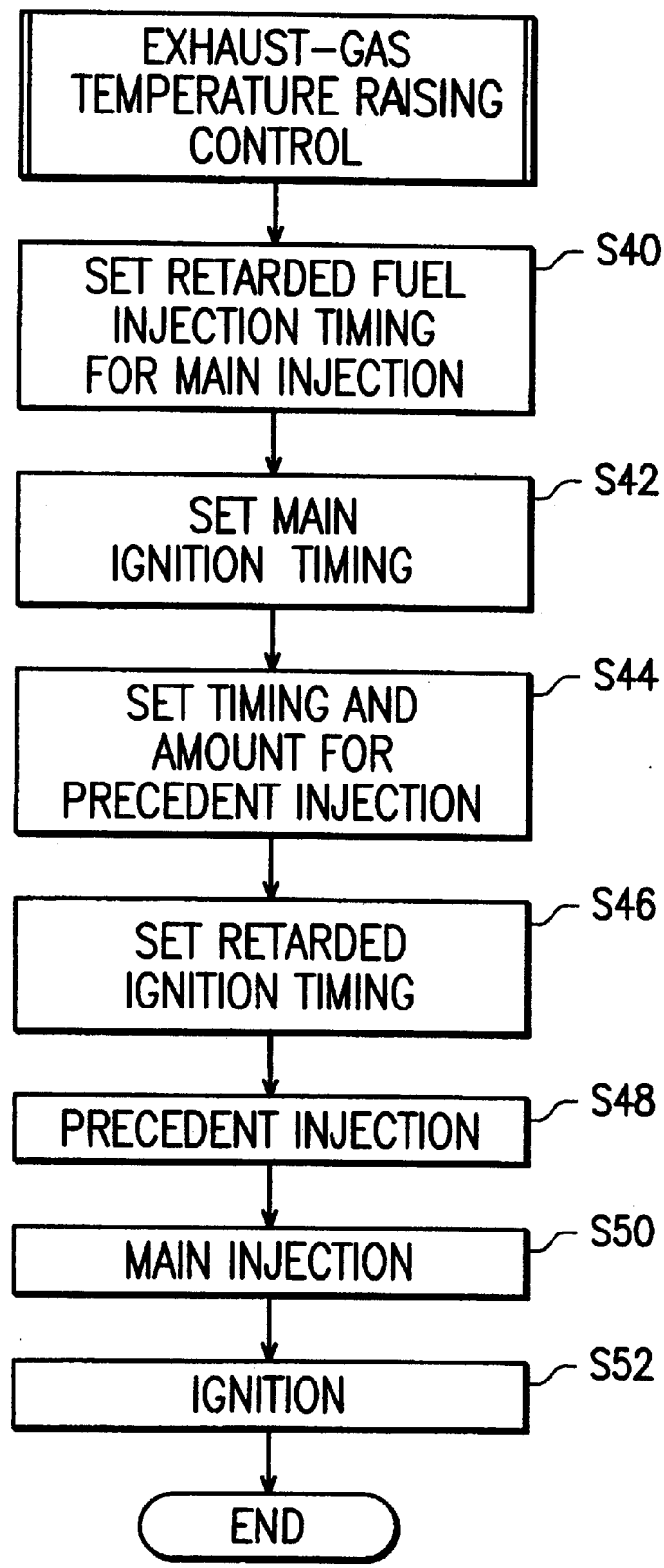
FIG. 7 is a flowchart showing an exhaust-gas temperature raising control routine according to a second embodiment of the present invention.

In the following, an exhaust-gas temperature raising control routine executed by the ECU of the system of the present embodiment will be explained with reference to FIG. 7.

At step 40, the fuel injection timing for the main fuel injection is set to one retarded than that for the normal control to form a rich mixture having an air-fuel ratio ranging from 8 to 10 in the cavity 1c, as in the case of the first embodiment. In step S42, a main ingnition timing is set.

At step S44, the fuel injection timing and fuel injection amount for the precedent fuel-injection are set. It is advisable to set the fuel injection timing to a value falling within an early stage of intake stroke, e.g., 320° BTDC, although the injection timing may fall within an early stage of compression stroke since the fuel injection amount for the precedent fuel-injection is small and hence the fuel precedently injected can be atomized within a short period of time. Preferably, the fuel injection amount for the precedent fuel-injection is set to a value ranging from 10% to 40% of the total fuel injection amount per operating cycle of the engine.

Figure 8:
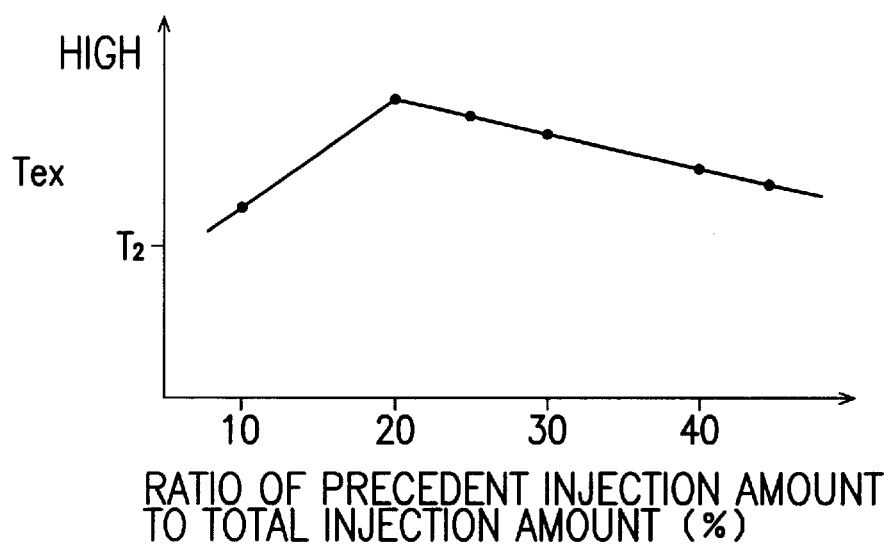
FIG. 8 is a graph showing exhaust-gas temperature Tex, observed when the exhaust-gas temperature raising control is carried out, as a function of ratio of an amount of fuel, precedently injected in intake stroke, to a total fuel injection amount.
Figure 9:
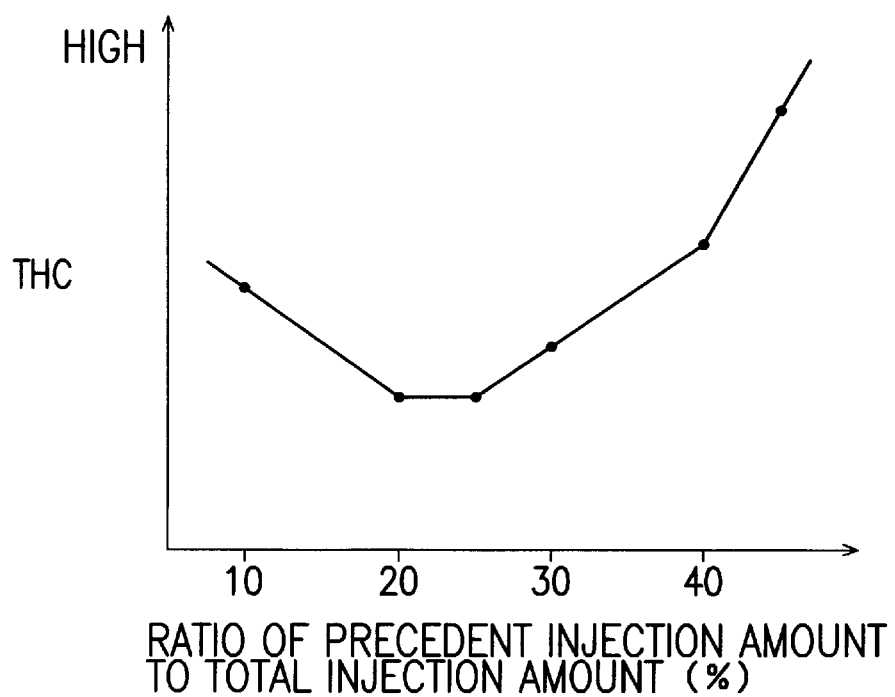
FIG. 9 is a graph showing an amount of unburnt hydrocarbon discharged from an exhaust port, observed when the exhaust-gas temperature raising control of the second embodiment is made, as a function of ratio of an amount of fuel, precedently injected in intake stroke, to a total fuel injection amount.

FIG. 8 shows the exhaust-gas temperature Tex as a function of a ratio of the fuel injection amount for the precedent fuel-injection to the total fuel injection amount. FIG. 9 shows the amount of unburned hydrocarbon discharged from the exhaust port 3a as a function of the fuel amount ratio. As seen from FIGS. 8 and 9, if the fuel amount for the precedent fuel-injection is set to a value ranging from 10% to 40% of the total fuel injection amount, the exhaust-gas temperature Tex can be raised to a value higher than the temperature T2, e.g., about 800° C. achieved by the system of the first embodiment, while considerably suppressing the emission of harmful unburned hydrocarbon to the atmosphere. Thus, in this embodiment, the fuel amount for the precedent fuel-injection is set to a value ranging from 10% to 40% of the total fuel injection amount.

As understood from FIGS. 8 and 9, the exhaust-gas temperature Tex reaches a maximum and the discharged amount of unburned hydrocarbon is suppressed to a minimum when the fuel amount ratio is in the vicinity of 20% of the total fuel injection amount. Thus, the fuel amount for the precedent fuel-injection is preferably set to a value equal to approximately 20% of the total fuel injection amount.

At step S46, the ignition timing is set so as to be retarded than that for the normal control, as in the case of the first embodiment.

Next, at step S48, the precedent fuel-injection is carried out.

Figure 10:
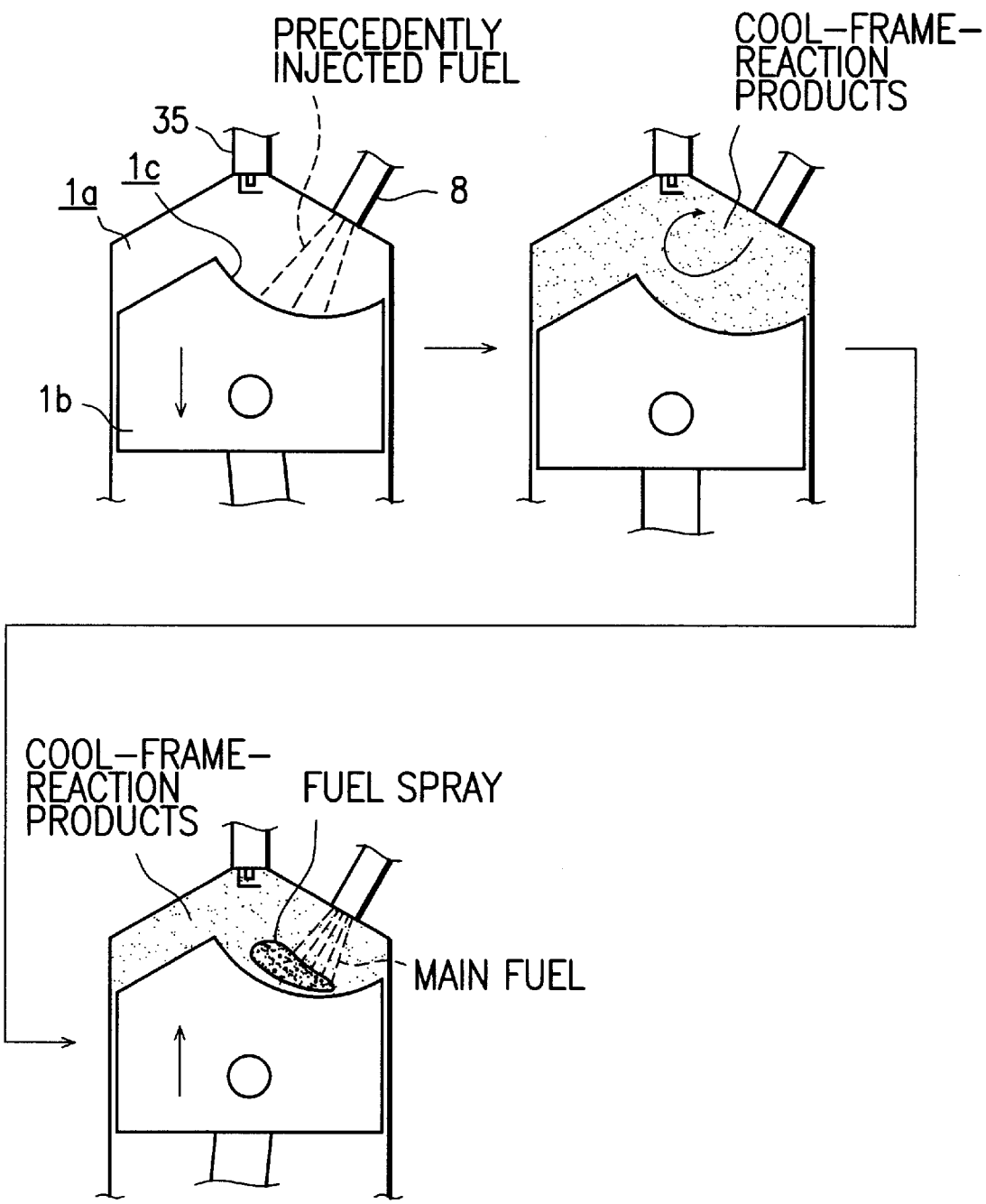
FIG. 10 is a view showing the sequence from a precedent fuel injection process to a main fuel injection process, observed when the precedent fuel injection of the second embodiment is carried out in the intake stroke.

In the following, the function of the precedent fuel-injection will be explained based on FIG. 10 showing conditions observed within the combustion chamber 1a during the course from the intake stroke to an early stage of the compression stroke in case that the precedent fuel-injection is carried out in the intake stroke.

At first, the fuel is injected in an amount of 10% to 40% of the total fuel injection amount at 320° BTDC in the intake stroke, as shown in upper left part of FIG. 10.

As the piston 1b moves downward, the precedently injected fuel is transported by inertial flow (tumble flow) of intake air and is diffused in the combustion chamber 1a, as shown in upper right part of FIG. 10. Subsequently, the piston 1b moves upward to compress the gasses in the combustion chamber, to thereby enhance a cool-frame reaction between the precedently injected fuel with air, producing chemical reactive species (cool-frame reaction products) such as CHO, $H_2O_2$, and OH.

Then, as shown in lower part of FIG. 10, a main fuel is injected and ignited (at steps S50 and S52 in FIG. 7) under the condition that the combustion chamber 1a is filled with the cool-frame reaction products and the piston 1b is at an upwardly moved position. As a result, the main fuel is enflamed, and a hot-frame reaction between the fuel spray and oxygen in the cavity 1c takes place. Further, the main fuel is combusted while a hot frame propagates, as shown in the lower part of FIG. 10. Part of the main fuel is incompletely combusted to produce incomplete-combustion materials such as hydrocarbon and carbon monoxide.

Subsequently, as the piston 1b moves downward, the incomplete-combustion materials diffuse away from the cavity 1c in the combustion chamber 1a. At this time, cool-frame reaction products are drifting within the combustion chamber 1a and serve to inflammation inducers which assist the re-combustion of the incomplete-combustion materials, so that the re-combustion of these materials continues.

As explained in the above, a two-stage fuel injection consisting of the precedent fuel-injection effected in intake stroke and the main fuel-injection effected in compression stroke is carried out in the present embodiment. The effect of the precedent fuel-injection will be further explained with reference to FIG. 11.

Figure 11:
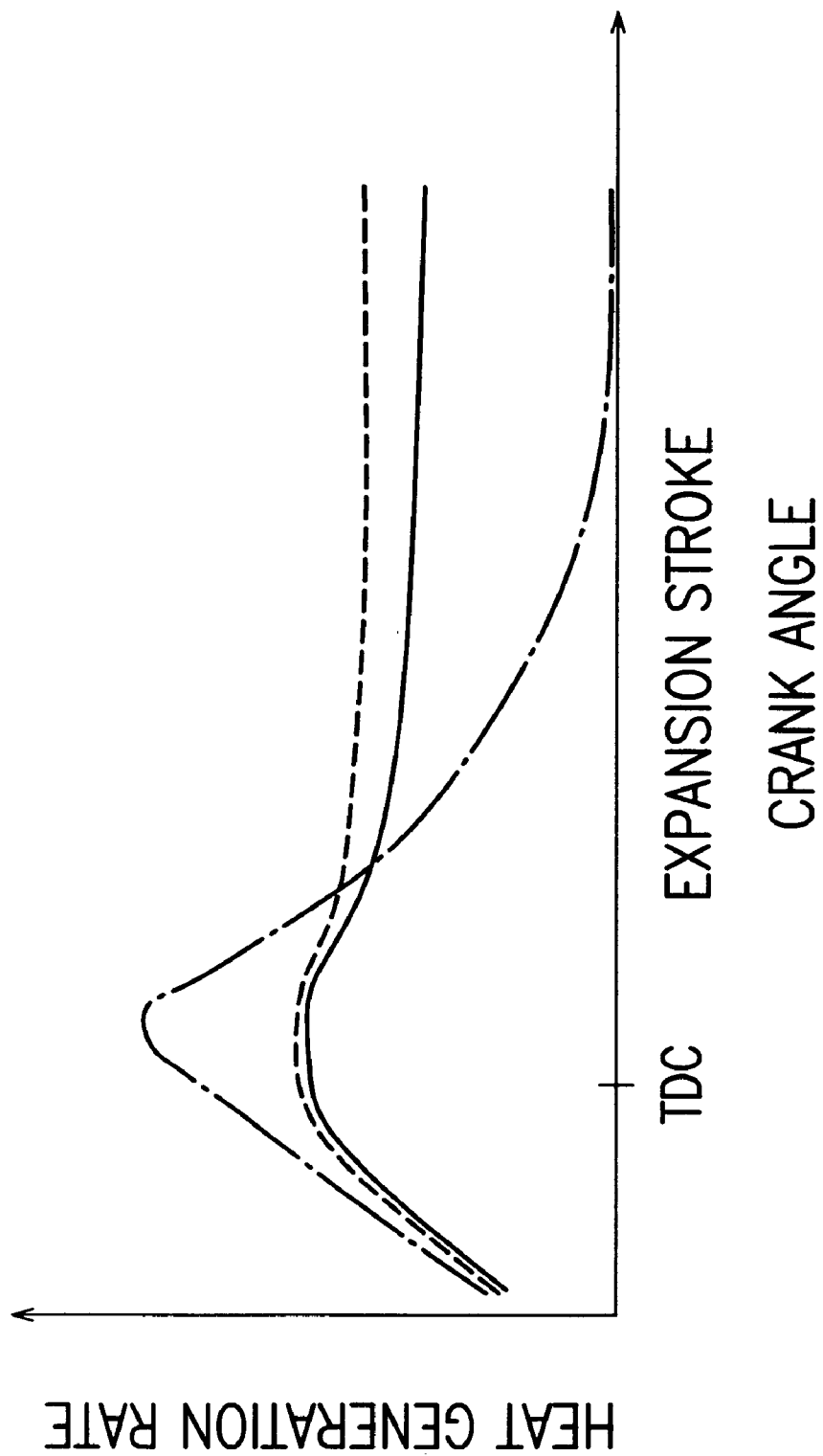
FIG. 11 is a graph showing, as a function of crank angle, the heat generation rate mainly in expansion stroke observed when the exhaust-gas raising control of the second embodiment is carried out.

In FIG. 11, a heat generation rate observed when the two-stage fuel injection of the present embodiment is carried out is shown by broken line as a function of crank angle, in comparison with heat generation rate shown by solid line and observed at the time of one-stage fuel injection of the first embodiment and that shown by one-dotted chain line and observed at the time of the ordinary control.

As seen from FIG. 11, the heat generation rate (shown by broken line) in expansion stroke attained by the two-stage fuel injection of the present embodiment is, as a whole, higher than that (shown by solid line) attained by the one-stage fuel injection of the first embodiment. As compared to the first embodiment where incomplete-combustion materials are re-combusted after they diffuse away from the cavity 1c to be permitted to react with oxygen, the present embodiment can further enhance the re-combustion of incomplete-combustion materials, by producing cool-frame reaction products serving as inflammation inducers in the combustion chamber 1a by means of the precedent fuel-injection. As a consequence, the exhaust-gas temperature Tex can be raised beyond a temperature T2 which can be attained by the first embodiment.

Figure 12:
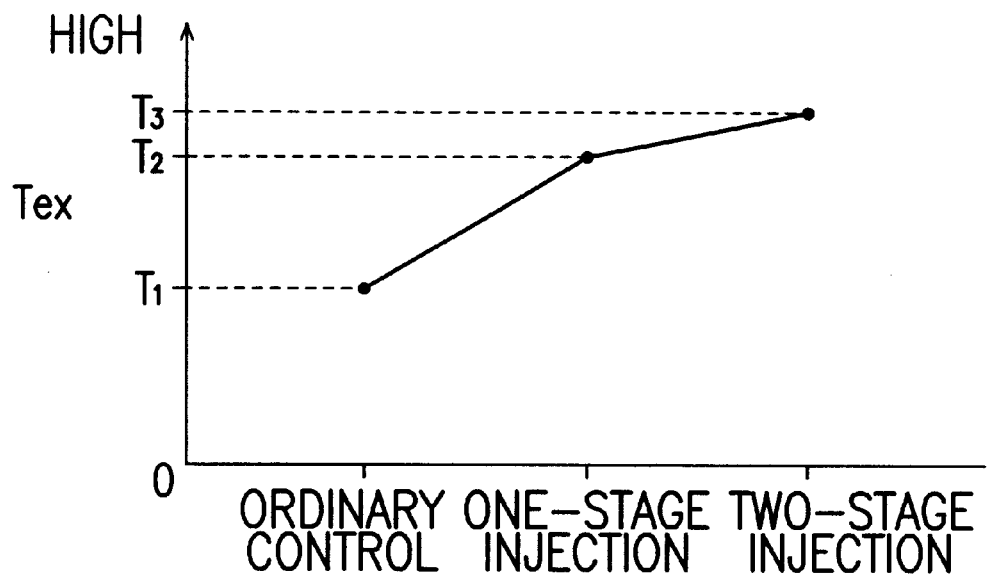
FIG. 12 is a graph showing the exhaust-gas temperatures Tex respectively observed at the time of ordinary fuel-injection control, one-stage fuel injection of the first embodiment, and two-stage fuel injection of the second embodiment.

FIG. 12 shows the exhaust-gas temperature Tex attained by the two-stage fuel injection according to the present embodiment, in comparison with those attained by the ordinary control and the one-stage fuel injection of the first embodiment. As seen from FIG. 12, the exhaust-gas temperature Tex attainable by means of the normal control is of the order, at most, of the lower active temperature limit T1, e.g., 400° C. By contrast, this, the first embodiment can raise the exhaust-gas temperature Tex up to a temperature value T2, e.g., 800° C., and the present embodiment can raise the exhaust-gas temperature up to a value T3, e.g., 900° C. In this manner, the exhaust-gas temperature raising control based on the two-stage fuel injection makes it possible to more rapidly heat the catalyst converter 9 for immediate activation.

Figure 13:
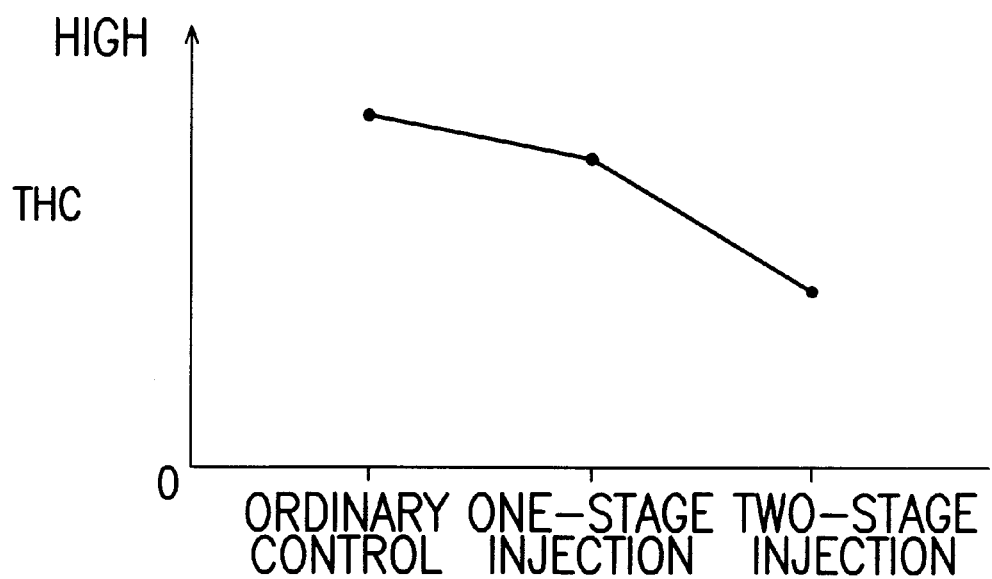
FIG. 13 is a graph showing discharge amounts of unburnt hydrocarbon THC respectively observed at the time of the ordinary fuel-injection control, one-stage fuel injection and two-stage fuel injection.

FIG. 13 shows discharged amounts of unburned hydrocarbon respectively observed in the case of the normal control, the one-stage fuel injection, and the two-stage fuel injection. As shown in FIG. 13, the emission of unburned hydrocarbon is suppressed when the one-stage fuel injection of the first embodiment is performed as compared to the case where the ordinary control is carried out, and further suppressed by the two-stage fuel injection according to the second embodiment. In this manner, the exhaust-gas temperature raising control of the first or second embodiment makes it possible to adequately prevent the emission of harmful substances to the atmosphere at the time when the catalyst converter 9 is not activated. Especially, the effect of preventing the emission of harmful gas components attained by the two-stage fuel injection of the second embodiment is noticeable.

In short, the exhaust-gas temperature raising system of the present invention, applied to in-cylinder injection type gasoline engines is operable to increase the amount of fuel injected in the compression stroke, thereby forming a rich air-fuel mixture in the cavity 1c, if the catalytic function of the catalyst converter 9 lowers with the decrease in the catalyst converter temperature Tcc, and causes the rich mixture to be combusted to produce incomplete-combustion materials which moderately react with oxygen contained in the air present in the combustion chamber 1a at locations away from the cavity 1c. As a result, the exhaust-gas temperature Tex is raised to be higher than that attained by the ordinary control. This makes it possible to adequately heat and activate the catalyst converter 9, while preventing the fuel consumption from increasing and heat energy from being wasted for expansion work. Such increased fuel consumption and waste of heat energy are entailed if an additional fuel is injected and combusted in an early stage of expansion stroke as in a conventional technical art.

The present invention is not limited to the foregoing first and second embodiments, but may be modified in various manners.

In the embodiments, a shift from the ordinary control to the exhaust-gas temperature raising control is made, without operating intake-air amount adjusting means such as ABV 50 to thereby maintain an amount of intake air unchanged. Alternatively, at the start of the exhaust-gas temperature raising control, the opening degree of the ABV 50 may be increasingly controlled to intentionally increase the amount of intake air, and at the same time, the fuel injection amount may be increased, so that the effect of exhaust-gas temperature raising effect may be further enhanced. On this occasion, it is advisable to control the engine control parameters such as fuel injection timing and ignition timing in such a manner that no substantial change in engine output torque is caused during the shift from the ordinary control to the exhaust-gas temperature raising control. The fuel injection timing, which is grasped in the above as an engine control parameter controlled by the ECU serving as engine control means, can be understood as a parameter which is controlled by the ECU serving as fuel injection control means.

Although the air amount adjusting means is constituted by the ABV 50 in the first and second embodiments, the air amount adjusting means may be comprised of an electronic throttle valve having an electrically-operated actuator, which adjusts the throttle opening independently of an amount of depression of accelerator pedal, if the engine is of a type having such an electronic throttle valve.

In the first and second embodiments, the present invention has been applied to an in-cylinder injection type gasoline engine which is designed to produce a tumble flow of intake air in the combustion chamber at the time of stratified combustion or lean burn combustion of injected fuel. However, the present invention is applicable to engines of a type injecting the fuel in at least compression stroke from a fuel injection valve and spark-igniting the injected fuel for stratified combustion, such as an in-cylinder injection type gasoline engine in which a swirl flow is produced.

What is claimed is:

1. An exhaust-gas temperature raising system for an in-cylinder injection type internal combustion engine in which fuel injected from a fuel injection valve directly into a combustion chamber is spark-ignited for stratified combustion, comprising:

engine operating condition detecting means for detecting an operating condition of the engine, in which an exhaust-gas temperature is required to rise, to raise a temperature of a catalyst;

fuel injection control means for controlling the fuel injection valve to inject the fuel, in a compression stroke of the engine, in such an amount as to form an over-rich air-fuel mixture locally around an ignition plug together with air in the combustion chamber, when the engine is in the operating condition in which the exhaust-gas temperature is required to raise; and engine control means for controlling an engine control parameter so that the fuel injected in the compression stroke and spark-ignited is insufficiently combusted around the ignition plug, and is then mixed with extra oxygen in the combustion chamber such that the insufficiently combusted fuel is combusted while being affected by a gas flow in the combustion chamber, when a control of the fuel injection valve is carried out by said fuel injection control means.

2. The exhaust-gas temperature raising system according to claim 1, wherein, when said fuel injection control means controls the fuel injection valve, said engine control means delays fuel injection timing, serving as the engine control parameter in the compression stroke, as compared to the fuel injection timing in the compression stroke at the time of an engine operation in which the exhaust-gas temperature is not required to raise.

3. The exhaust-gas temperature raising system according to claim 2, wherein, when the fuel injection timing is delayed as compared to the fuel injection timing in the compression stroke at the time of the engine operation in which the exhaust-gas temperature is not required to raise, said engine control means delays the ignition timing, serving as the engine control parameter, as compared to the ignition timing at the time of the engine operation in which the exhaust-gas temperature is not required to raise.

4. The exhaust-gas temperature raising system according to claim 2, wherein said fuel injection control means controls the fuel injection valve so that part of the fuel is precedently injected during an intake stoke, prior to the injection of the fuel at the delayed fuel-injection timing in the compression stroke, said intake and compression strokes belonging to the same operating cycle of the engine.

5. The exhaust-gas temperature raising system, according to claim 4, wherein an amount of fuel to be precedently injected is set to a value varying from about 10% to 40% of a total amount of fuel to be injected during a single operating cycle per cylinder of the engine.

6. The exhaust-gas temperature raising system according to claim 1, further comprising:

air amount adjusting means for adjusting an amount of air introduced into the combustion chamber, wherein said fuel injection control means controls the fuel injection valve to increase an amount of the injected fuel as the amount of the introduced air adjusted by said air amount adjusting means increases.

7. The exhaust-gas temperature raising system according to claim 1, wherein, when the engine is in the operating condition in which the exhaust-gas temperature is required to raise, an amount of fuel to be injected during a single operating cycle per cylinder of the engine is set such that an air-fuel ratio varying between an air-fuel ratio close to a stoichiometric air-fuel ratio and an air-fuel ratio slightly leaner than the stoichiometric air-fuel ratio is formed in the combustion chamber.

8. The exhaust-gas temperature raising system according to claim 1, wherein, when the fuel injection valve is controlled by said fuel injection control means, said engine control means delays the ignition timing, serving as the engine control parameter, as compared to the ignition timing at the time of the engine operation in which the exhaust-gas temperature is not required to raise.

9. The exhaust-gas temperature raising system according to claim 1, wherein said engine operating condition detecting means detects whether the engine is operating in a lean-combustion operating region.

10. The exhaust-gas temperature raising system according to claim 9, wherein said lean-combustion operating region includes a compression-stroke lean injection region.

11. The exhaust-gas temperature raising system according to claim 9, wherein said lean-combustion operating region includes an intake-stroke lean injection region.

12. The exhaust-gas temperature raising system according to claim 9, wherein said engine operating condition detecting means detects whether a throttle opening has been maintained at least for a predetermined period of time.

13. The exhaust-gas temperature raising system according to claim 1,
wherein said engine control means terminates the control of the engine control parameter after a predetermined period of time after initiation of the engine control parameter control.

14. The exhaust-gas temperature raising system according to claim 1, further, comprising:
a temperature detecting unit adapted to detect a temperature of the catalyst,
wherein said engine control means terminates the control of the engine control parameter when the detected temperature exceeds a predetermined value.

* * * * *